April 1, 1941.  G. H. STONER  2,236,612
LAWN MOWER
Filed Oct. 27, 1939
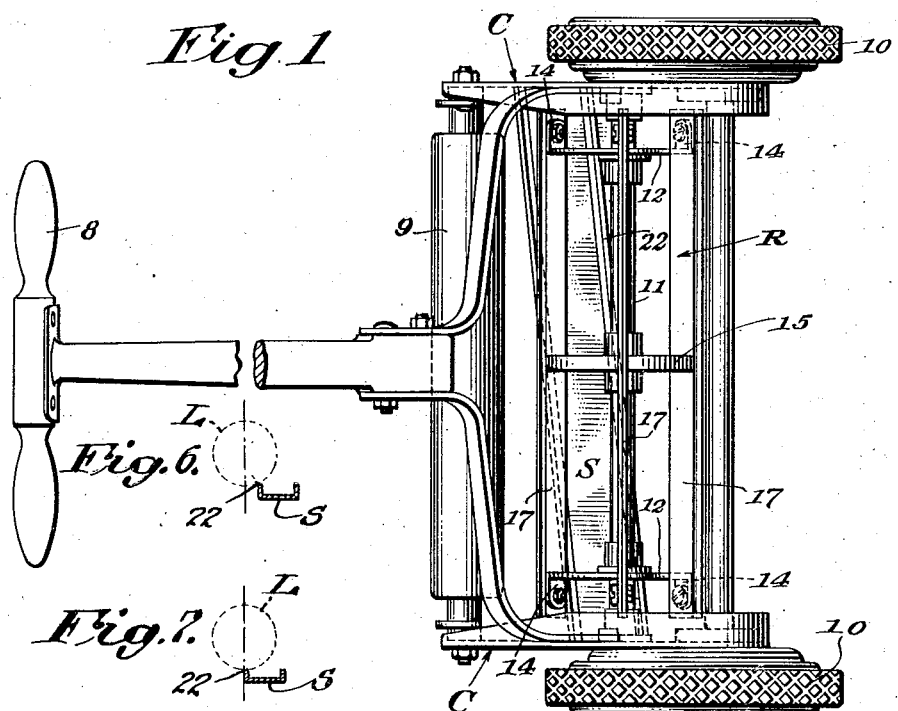
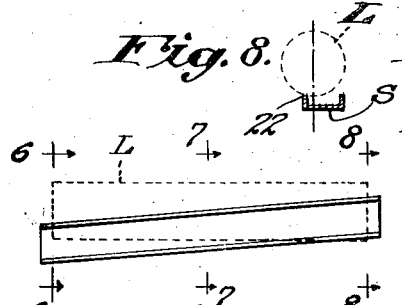
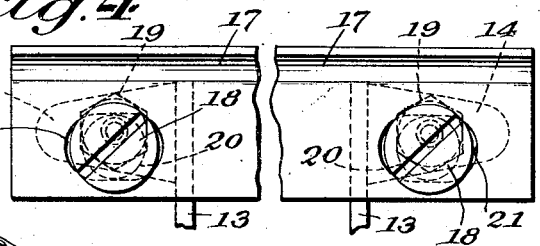
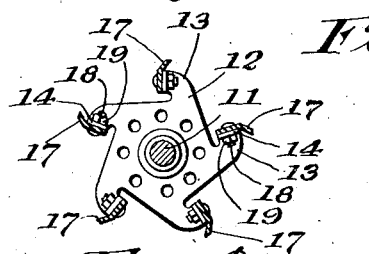
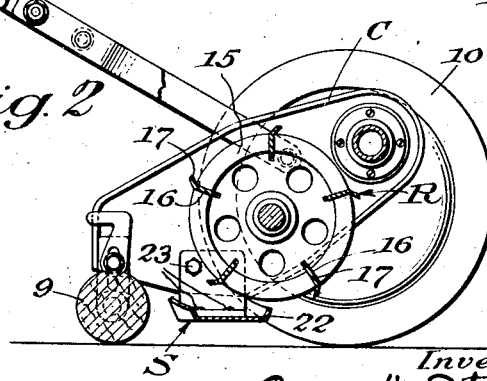
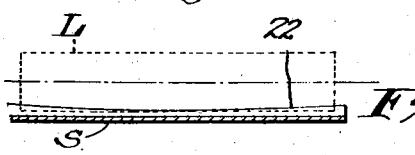
Inventor:
George H. Stoner
By Dike, Calvert + Gray
Attorneys.

Patented Apr. 1, 1941

2,236,612

UNITED STATES PATENT OFFICE 2,236,612

LAWN MOWER

George H. Stoner, East Boston, Mass.

Application October 27, 1939, Serial No. 301,592

5 Claims. (Cl. 56—294)

The conventional lawn mower comprises essentially a rotatable reel having a plurality of helically shaped cutting blades cooperating with a straight edge stationary shear bar. Such machines, when in good working condition, operate in a highly satisfactory manner to cut the grass and leave a good appearing lawn. They do, however, present a rather troublesome problem in manufacture which can be solved successfully only by the use of expensive machinery skilfully operated. This problem centers about the manufacture of the reel which usually is a rigid structure mounted upon a rotatable shaft and containing four or five helically shaped cutting blades. These blades must be ground so that the cutting edge of each will subscribe the same true cylindrical surface. This same problem is confronted again in the repair of the machine if any one of the cutting blades of the reel becomes injured by hitting a stone or the like.

The present invention entirely eliminates this problem by providing a machine having a shear bar with a helically shaped cutting edge and making possible the use of a rotatable reel in which the cutting blades have a straight cutting edge. In the preferred construction, the straight cutting blades of the rotatable reel are adjustable radially of the axis of rotation, thus making it possible to sharpen each separately and adjust the position of the same with respect to the shear bar.

The invention will be more clearly understood from the following description in conjunction with the accompanying drawing, in which, Fig. 1 is a plan view of a machine embodying the invention;

Fig. 2 is a longitudinal sectional elevational view of the same;

Fig. 3 is a detail sectional view taken along the line 3—3 of Fig. 1;

Fig. 4 is a detail front view of one of the cutting blades of the reel and its mounting;

Fig. 5 is a diagrammatic plan view showing the engaging relationship between the shear bar and the blades of the reel, the dotted line representing the locus of movement of the cutting edges of the blades of the reel;

Figs. 6, 7 and 8 are diagrammatic sectional views taken upon lines 6—6, 7—7 and 8—8 of Fig. 5; and Fig. 9 is a longitudinal sectional front elevational view of the shear bar in which the locus of movement of the cutting edges of the blades of the reel is shown in dotted line.

A lawn mower embodying the invention is illustrated in the accompanying drawing and comprises a chassis C supported by a pair of main wheels 10 and an idler roll 9. The usual handle 8 is connected to the chassis by which the operator guides the movement of the machine. At least one of the wheels 10 is connected through suitable gearing to the main shaft 11 of the reel R so that rotation of the wheels 10 causes rotation of the reel R.

The reel R comprises the main shaft 11 which is mounted for rotation in suitable bearings in the chassis C. A plate 12 is secured to the shaft 11 near each end thereof. Each plate 12 is provided with five projections 13 the end of which is bent outwardly at right angles to the plate to provide an ear 14. Secured upon the shaft 11 midway between the two plates 12 is a flywheel 15 having five transverse peripheral grooves 16 to receive cutting blades 17. Corresponding ears 14 on the plates 12 are in alinement and are also alined with corresponding grooves 16 in the flywheel 15. The blades 17 are longitudinally straight, but are bent transversely to increase their rigidity. In other words, each blade is provided with a straight cutting edge as distinguished from a helically-shaped cutting edge in the conventional lawn mower. The blades 17 slidably fit in the grooves 16 and are secured to the ears 14 by bolts 18 the ends of which are threaded to receive a nut 19. Each bolt 18 is provided intermediate its ends with an eccentric 20 engaging an elongated hole 21 in the blade 17. A shear bar S is secured to the chassis C by bolts 23 and is provided with a helically shaped cutting edge 22 all points of which lie in the geometric figure subscribed by the cutting edges of the blades 17 upon rotation of the reel R. The blades 17 may be adjusted radially of the reel so that successive points of their cutting edges engage successively along the cutting edge of the shear bar as the reel is rotated. This may be accomplished by loosening the nuts 19 and turning the bolts 18 as with a screw driver and then tightening the nuts 19 to maintain the adjusted positions of the eccentrics on the bolts.

The relationship between the blades 17 of the rotatable reel and the shear bar S is illustrated in detail in Figs. 5, 6, 7 and 8. It will be noted that as the reel is rotated the locus of movement of the cutting edges of the blade 17 is a cylindrical surface L. The axis of this cylinder is the axis of the shaft 11. The shear bar S is arranged at an angle to the axis of the cylinder L. All points along the cutting edge 22 of the shear bar S lie in the cylindrical surface L since the cutting edge 22 is helically shaped. It will be noted from an examination of Figs. 6, 7 and 8 that successive points of engagement between the cutting edges of the blades 17 and the cutting edge 22 of the shear bar are in different vertical planes.

I claim:

1. In a lawn mower, in combination, a chassis, a shear bar fixed upon said chassis, a shaft rotatably carried by said chassis, a disc fixed to said shaft intermediate the ends of the latter and having transverse peripheral grooves, supports fixed to said shaft near its ends and alined with said grooves, a plurality of cutting blades each extending through one of said grooves and secured at their ends to said supports, each of said blades having a straight cutting edge, said blades being arranged to engage said shear bar at an angle, said shear bar having a cutting edge of helical shape to engage all points successively along the cutting edge of said blade as the latter is rotated, and eccentrics carried by said supports and engaging said blades for adjusting said blades radially of said shaft.

2. A lawn mower having in combination, a rotatable reel carrying a cutting blade having a substantially straight cutting edge disposed substantially parallel to the axis of rotation of said reel, and a stationary shear bar having a cutting edge arranged at an angle to the axis of said reel to engage successively and in different vertical and horizontal planes all points of the cutting edge of said blade as the latter is rotated.

3. A lawn mower having in combination, a rotatable reel carrying a cutting blade having a substantially straight cutting edge disposed substantially parallel to the axis of rotation of said reel, a stationary shear bar having a cutting edge arranged at an angle to the axis of said reel to engage successively and in different vertical and horizontal planes all points of the cutting edge of said blade as the latter is rotated, and means on said blade reacting with complementary means on said reel for adjusting the blade radially of the reel so that successive points of its cutting edge engage successively along the cutting edge of said shear bar.

4. A lawn mower having in combination, a rotatable reel carrying a cutting blade having a substantially straight cutting edge disposed substantially parallel to the axis of rotation of said reel, a stationary shear bar having a cutting edge of substantially helical shape to engage successively and in different vertical planes all points of the cutting edge of said blade as the latter is rotated, and means on said blade coacting with complementary means on said reel for adjusting each of the blades radially of the reel so that successive points of its cutting edge successively engage along the cutting edge of said shear bar.

5. A lawn mower having in combination, a chassis, a shear bar fixed upon said chassis and having a cutting edge of substantially helical shape, a shaft rotatably carried by said chassis, said shaft having spaced support-members thereon, a plurality of cutting blades, means on said blades coacting with complementary means on said supporting members for adjusting each of the blades radially of the shaft so that successive points of its cutting edge successively engage along the cutting edge of the shear bar, each of said blades having a straight cutting edge disposed substantially parallel to the axis of said shaft, and said shear bar being arranged at an angle to the axis of said shaft so that its cutting edge engages all points successively along the cutting edge of each of said blades as the latter are rotated.

GEORGE H. STONER.